United States Patent
Oda et al.

(10) Patent No.: US 6,184,782 B1
(45) Date of Patent: Feb. 6, 2001

(54) VEHICLE WITH REAR VEHICLE DETECTING APPARATUS

(75) Inventors: Naoki Oda; Masahiko Sano, both of Tokyo; Satosi Baba; Junshiro Motoyama, both of Osaka, all of (JP)

(73) Assignee: NEC Corporation, Tokyo (JP)

( * ) Notice: Under 35 U.S.C. 154(b), the term of this patent shall be extended for 0 days.

(21) Appl. No.: 09/328,448

(22) Filed: Jun. 9, 1999

(30) Foreign Application Priority Data

Jun. 9, 1998 (JP) ................................................... 10/161038

(51) Int. Cl.⁷ ....................................................... B60Q 1/00
(52) U.S. Cl. .......................... 340/435; 340/436; 340/588; 340/903; 180/167
(58) Field of Search ..................................... 340/435, 436, 340/903, 901, 904, 932, 939, 942, 587, 588, 589, 565, 584, 187; 180/167, 169

(56) References Cited

U.S. PATENT DOCUMENTS

| | | | |
|---|---|---|---|
| 4,833,469 | * 5/1989 | David | 340/901 |
| 5,026,153 | * 6/1991 | Suzuki et al. | 356/1 |
| 5,646,612 | * 7/1997 | Byon | 340/903 |
| 5,694,335 | * 12/1997 | Hollenberg | 364/514 |
| 5,703,368 | * 12/1997 | Tomooka et al. | 250/349 |
| 5,877,688 | * 3/1999 | Morinaka et al. | 340/584 |

* cited by examiner

Primary Examiner—Benjamin C. Lee
Assistant Examiner—Davetta W. Goins
(74) Attorney, Agent, or Firm—McGinn & Gibb, PLLC

(57) ABSTRACT

In order to achieve an aspect of the present invention, a rear vehicle detecting apparatus of a vehicle include an alarm unit, a temperature detecting section, a reference temperature data generating section, a comparing section, and a drive section. The temperature detecting section detects a first temperature data based on heat radiated from another vehicle which exists behind the vehicle. The reference temperature data generating section generates a second temperature data as a reference. The comparing section compares the first temperature data and the second temperature data. The driving section drives the alarm unit based on the comparing result by the comparing section.

22 Claims, 5 Drawing Sheets

VEHICLE WITH REAR VEHICLE DETECTING APPARATUS

BACKGROUND OF THE INVENTION

1. Field of the Invention

The present invention relates to a rear vehicle detecting apparatus, and more particularly to a rear vehicle detecting apparatus of a vehicle which can detect another vehicle following the vehicle from oblique rear in the same direction as the vehicle runs.

2. Description of the Related Art

Generally, a vehicle such as an automobile runs on a lane indicated on a road, and the driver of the vehicle changes the lane into an adjacent lane based on the running situation. In a case to change the running lane, the driver confirms whether or not another vehicle is running on the adjacent lane, by a rearview mirror such as a door mirror, a room mirror and a fender mirror, and then the driver changes the running lane.

Conventionally, the technique is proposed, in which a transmission and reception unit for laser light or millimeter wave is arranged in the front portion of a following vehicle, and the running speed of the following vehicle is decelerated based on an output signal from the transmission and reception unit, when the distance from the following vehicle to a preceding vehicle is smaller than a predetermined value.

According to this proposal, when the preceding vehicle and the following vehicle runs on the same lane, the laser from the following vehicle is reflected in the rear of the preceding vehicle, because the rear of the preceding vehicle and the front of the following vehicle oppose. Therefore, it is possible for the reflected laser to be detected by the reception unit arranged in the front of the following vehicle.

However, when the preceding vehicle and the following vehicle are running on different lanes, the laser beam reflected by the preceding vehicle can not be sufficiently detected by the reception unit of the following vehicle, because the rear of the preceding vehicle and the front of the following vehicle do not oppose. Therefore, the detection precision of the existence of the preceding vehicle reduces remarkably.

SUMMARY OF THE INVENTION

An object of the present invention is to provide a vehicle with a rear vehicle detecting apparatus for detecting another vehicle running on a different lane.

In order to achieve an aspect of the present invention, a rear vehicle detecting apparatus of a vehicle include an alarm unit, a temperature detecting section, a reference temperature data generating section, a comparing section, and a drive section. The temperature detecting section detects a first temperature data based on heat radiated from another vehicle which exists behind the vehicle. The reference temperature data generating section generates a second temperature data as a reference. The comparing section compares the first temperature data and the second temperature data. The driving section drives the alarm unit based on the comparing result by the comparing section.

The temperature detecting section preferably includes an optical system collecting the heat radiated from the other vehicle which exists behind the vehicle, an infrared sensor detecting the collected heat by the optical system, and a converting section converting the detected heat into the first temperature data.

In this case, when the optical system includes a lens, the temperature detecting section may include a plurality of sets of the lens and the infrared sensor. At this time, the plurality of sets are provided to have different fields of view.

Also, the optical system may include a first mirror collecting the heat radiated from the other vehicle which exists behind the vehicle, and a second mirror which reflects the collected heat by the first mirror on the infrared sensor.

Further, the optical system may include a prism collecting the heat radiated from the other vehicle on the infrared sensor when the other vehicle exists in different positions relative to the vehicle.

The temperature detecting section further includes a drive section driving the optical system and the infrared sensor to orient different fields of view, depending upon time.

The rear vehicle detecting apparatus may include two sets of the temperature detecting sections respectively provided in a rear portion of the vehicle on left and right sides.

Also, the reference temperature data generating section may include a measuring unit measuring at least an element of whether circumstance of the vehicle, and a generating unit generating the second temperature data based on the measuring result of the measuring unit.

When the temperature detecting section includes a plurality of infrared sensors detecting the radiated heat, it is preferable that the comparing section time-divisionally compares the first temperature data and the second temperature data for every infrared sensor.

Also, it is preparable that the alarm unit is driven to output an alarm auditorily, and is provided in a front portion of the vehicle.

When the temperature detecting section includes at least an infrared sensor, it is preferable that the infrared sensor is of a bolometer type, a pyroelectric type, or a thermopile type.

In order to achieve another aspect of the present invention, a vehicle includes a rear vehicle detecting apparatus which includes a heat detecting section provided in a rear portion of the vehicle to detect heat radiated from another vehicle, and an alarm unit provided to output an alarm corresponding to the detecting result by the heat detecting section.

DESCRIPTION OF THE PREFERRED EMBODIMENTS

Next, a vehicle with a rear vehicle apparatus of the present invention will be described below in detail with reference to the attached drawings.

FIGS. 1 to 4 show the back vehicle detecting apparatus according to the first embodiment of the present invention.

Figure 1:
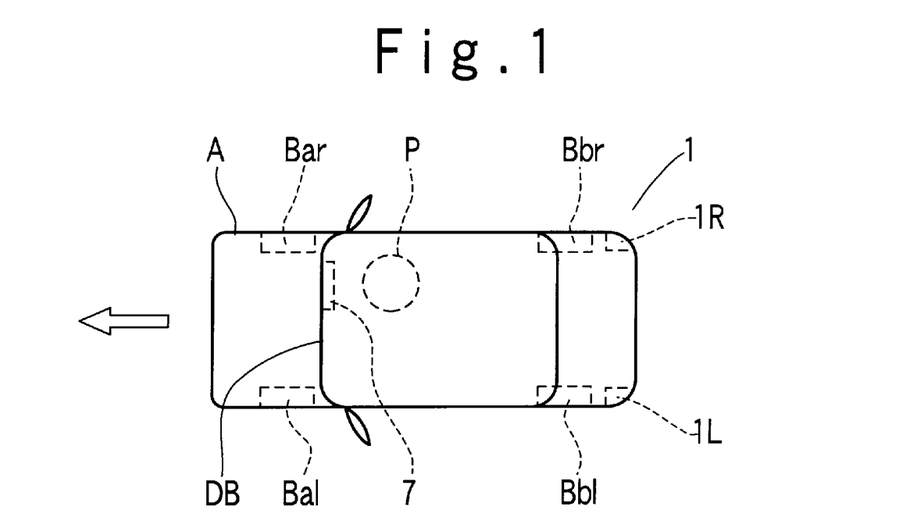
FIG. 1 is a plan view of a vehicle with a rear vehicle detecting apparatus of the present invention.

Referring to FIG. 1, a vehicle A is provided with tires Bal and Bar on either front side and tires Bbl and Bbr on back either side. Also, referring to FIG. 2, the vehicle A has the rear vehicle detecting apparatus a detecting unit section 1, an alarm unit 7 and a steering mechanism lock mechanism 9. The alarm unit 7 may be composed of a buzzer, a lamp, a speaker, or a liquid crystal display. In this embodiment, the alarm unit 7 is a buzzer and provided in dashboard in the front portion of the vehicle A. The steering mechanism restriction mechanism 9 will be described later.

Figure 2:
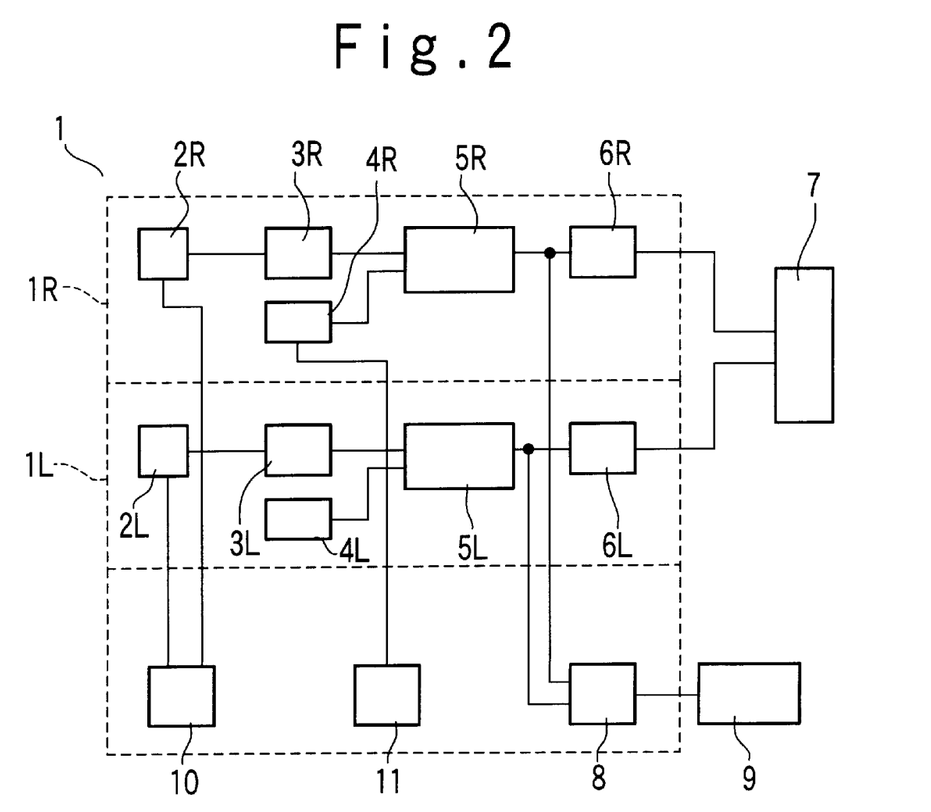
FIG. 2 is a block diagram of the rear vehicle detecting apparatus according to a first embodiment of the present invention.

The detecting unit section 1 is composed of a left detecting unit 1L, a right detecting units 1R, a control section 8, a circumstance element detecting unit 10, and a sensor driving section 11. The left detecting unit 1L and the right detecting units 1R are arranged in the rear portion of the vehicle A on either side. The left detecting unit 1L and the right detecting unit 1R have substantially the same structure. The control section 8, the circumstance temperature detecting unit 10, and the sensor driving section 11 will be described later.

The left detecting unit 1L is composed of an infrared sensor section 2, a temperature converting section 3, a reference temperature setting section 4, a comparing and determining section 5 and a drive circuit 6. The infrared sensor section 2 detects heat radiated from a vehicle 1A to generate a heat detection signal. The temperature converting section 3 converts the heat detection signal supplied from the infrared sensor 2 to a data indicative of a detection temperature. The reference temperature setting section 4 outputs a data indicative of a reference temperature. The comparing and determining section 5 compares the detection temperature data supplied from the temperature converting section 3 and the reference temperature data supplied from the reference temperature setting section 4 to determine whether or not the detection temperature is higher than the reference temperature. The drive circuit 6 operates based on the determining result of the comparing and determining section 5 to drive the alarm unit 7 to be described later.

The alarm unit 7 is connected to the drive circuit 6 of each detecting unit 1L and 1R. It should be noted that the temperature converting section 3, the reference temperature setting section 4, and the comparing and determining section 5 in each detecting unit 1L or 1R are realized by a CPU and a software.

Figure 3:
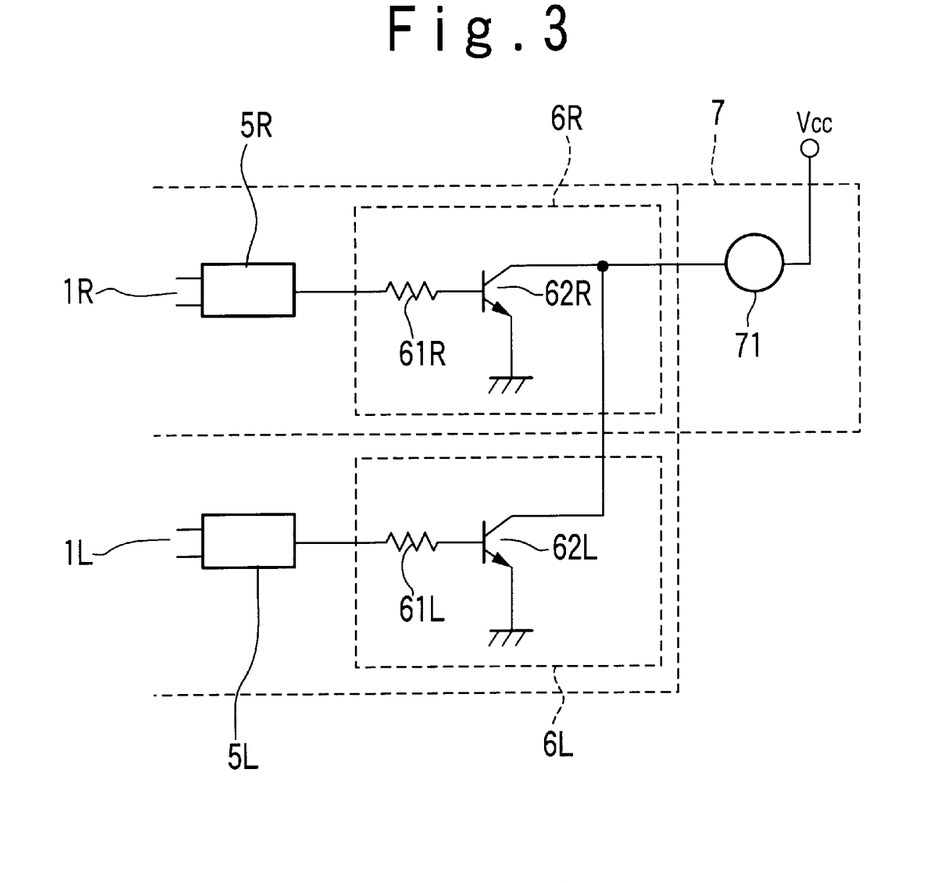
FIG. 3 is a circuit diagram of a detecting unit section of the rear vehicle detecting apparatus in the first embodiment.

Referring to FIG. 3, the drive circuit 6 in each of the left detecting unit 1L and the right detecting unit 1R is composed of a resistance 61 and a transistor 62 as a switching element. The collectors of the transistors 62R and 62L in the drive circuits 6R and 6L of the left detecting unit 1L and the right detecting unit 1R are connected together with the alarm unit 7 such as a buzzer 71. The outputs of the comparing and determining sections 5R and 5L are connected to the bases of the transistors 62R and 62L through resistors 61R and 61L, respectively. It should be noted that the DC power supply Vcc is supplied to the buzzer 71.

The infrared sensor section 2 (2R, 2L) in each of the left detecting unit 1L and the right detecting unit 1R detects the infrared rays radiated from an engine room and/or a tire of the following vehicle A1. For example, the infrared sensor section 2 has a lens 8 and an infrared sensor 12 as a single sensor element or a sensor element array in a sealed container. The inner space of the infrared sensor 12 is set to the vacuum state or filled with a xenon gas. The infrared sensor 12 may be of a cooling type or a non-cooling type. However, the infrared sensor 12 of a non-cooling type bolometer using a resistance change dependent upon temperature is preferable, and such an infrared sensor has the temperature resolution of about 0.1° C. It should be noted that a thermopile-type infrared sensor, which has a low sensitivity, and a pyroelectric type infrared sensor which requires a chopper may be applied as the infrared sensor 12, in addition to the bolometer type infrared sensor 12.

Figure 4:
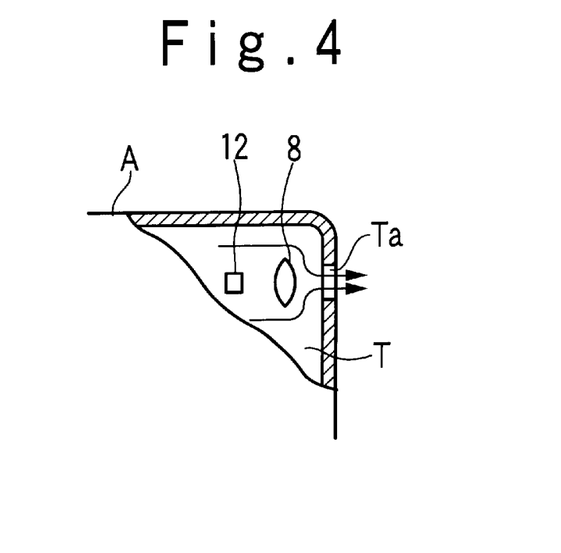
FIG. 4 is a cross sectional view of a rear section of the vehicle with the rear vehicle detecting apparatus in the first embodiment.

In the rear vehicle detecting apparatus, the left detecting unit 1L and the right detecting unit 1R are arranged to be isolated from each other in the trunk section T in the rear portion of the vehicle A. Also, the alarm unit 7 is arranged in the dashboard section DB in the vehicle A (FIG. 1). Especially, the infrared sensor sections 2R and 2L of the left detecting unit 1L and the right detecting unit 1R are provided to sense the infrared rays through the lenses 8 and holes Ta which are formed on either side of the trunk section T. The infrared sensor 12 is arranged to detect heat collected by the lens 8 from the heat source such as the tire Bar of the following vehicle A1 which exists obliquely behind the vehicle A on the left side. Also, the infrared sensor section 2R of the right detecting unit 1R is arranged to detect the heat source such as the tire Bal of the following vehicle which exists obliquely behind the vehicle A on the right side. It should be noted that relatively dry air is flowed out from the hole Ta of the trunk section T to prevent moisture from being adhered on the infrared sensor 2 and the lens 8, as shown in FIG. 4 by the arrows.

Figure 5:
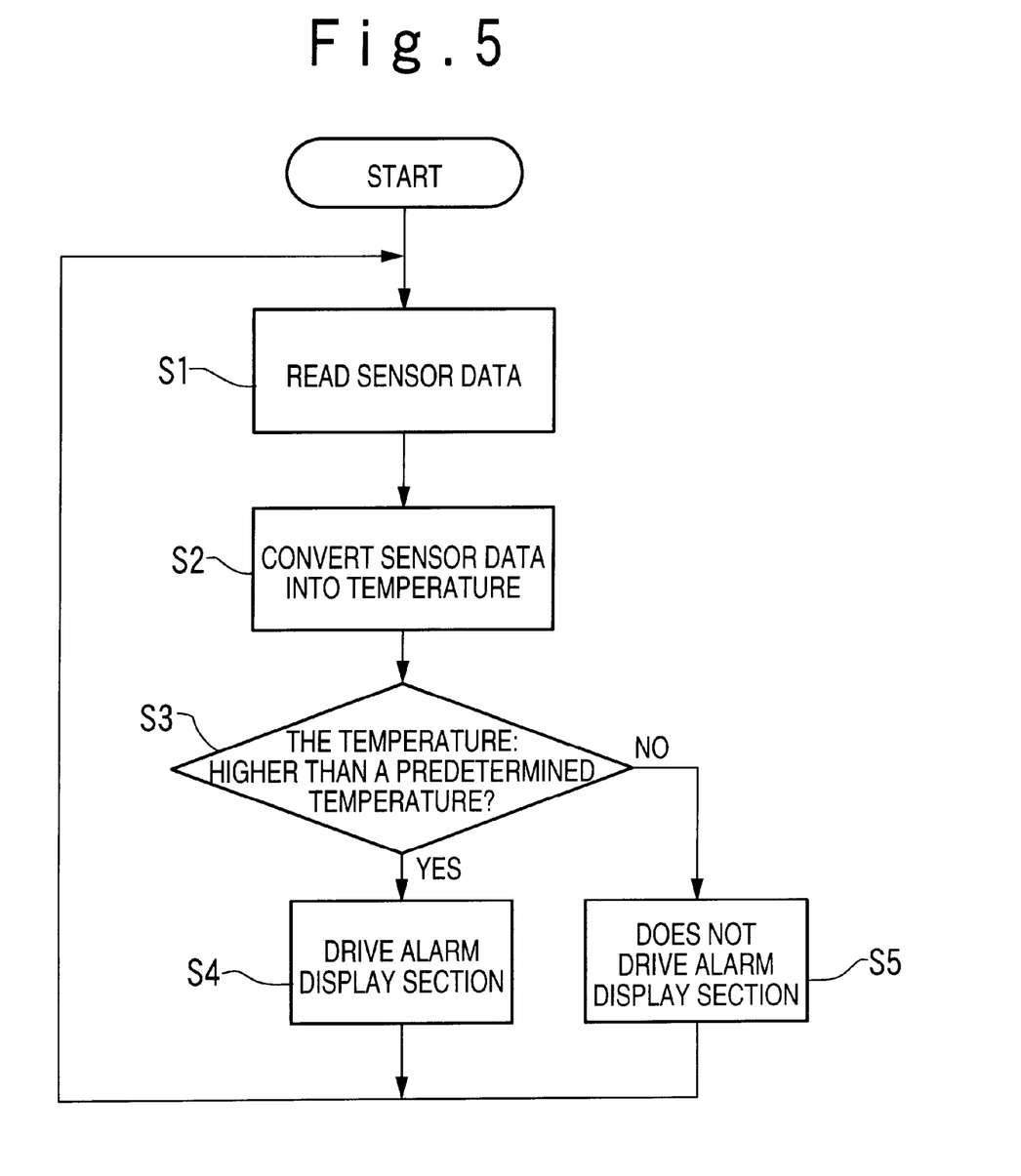
FIG. 5 is a flow chart to explain the operation of the rear vehicle detecting apparatus according to the first embodiment of the present invention.

Next, the operation of the rear vehicle detecting apparatus according to the first embodiment of the present invention will be described with reference to FIGS. 5 and 6.

Figure 6:
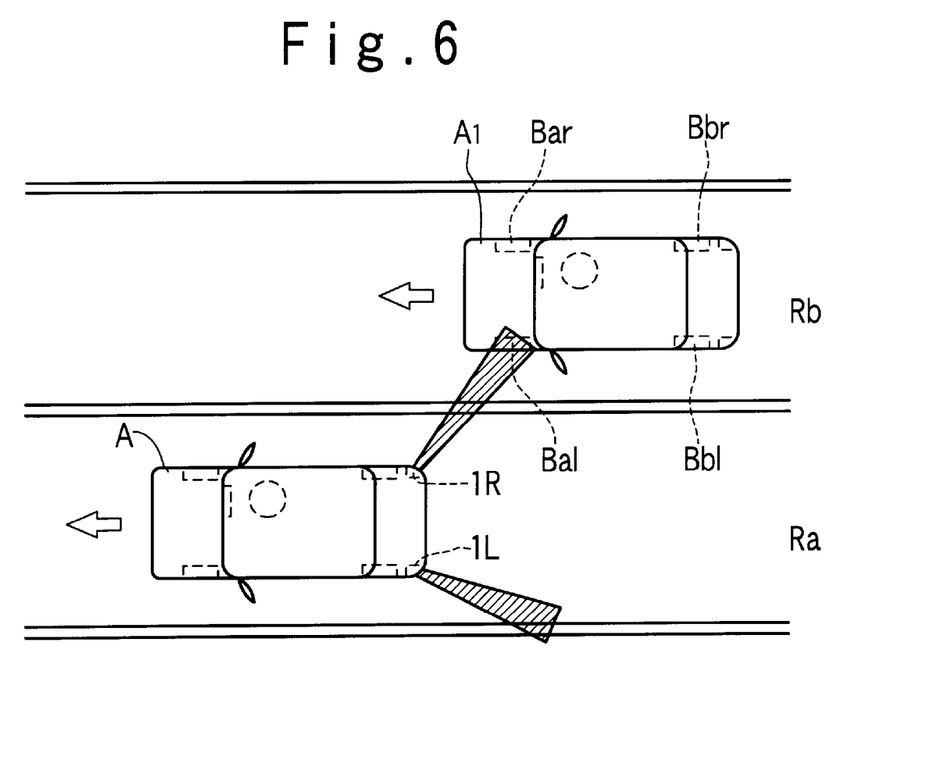
FIG. 6 is a diagram to explain the operation of the rear vehicle detecting apparatus according to the first embodiment of the present invention.

In FIG. 6, it is supposed that the preceding vehicle A is running on a running lane Ra and the following vehicle A1 is running on a passing lane Rb in the direction indicated by the arrow. The left detecting unit 1L and the right detecting unit 1R are arranged in the respective rear portions of the preceding vehicle A. The infrared sensor section 2 of the right detecting unit 1R detects heat radiated from the tire Bar of the following vehicle A1 which exists obliquely behind the vehicle A on the right side (Step S1 in FIG. 5). The temperature converting section 3 converts the heat detection signal outputted from the infrared sensor 2 into the detection temperature data (Step S2) to output to the comparison and at determining section 5. On the other hand, the reference temperature data is supplied from the reference temperature setting section 4 to the comparing and determining section 5. The reference temperature is desirably changed based on external environment, because the temperature of the tire depends on the season, the weather, and an ambience temperature. For this purpose, the reference temperature setting section 4 is connected with the circumstance element detecting unit 10. The circumstance element detecting unit 10 is a thermometer or an ombroscope in this embodiment to measure a circumstance temperature or a rain amount as a circumstance element. The reference temperature setting section 4 determines the reference temperature based on the measuring result by the circumstance element detecting unit 10. Thus, the reference temperature is automatically changed.

The comparing and determining section 5 compares the detection temperature data from the infrared sensor section 2 and the reference temperature data from the reference temperature setting section 4 to determine whether or not the detection temperature is higher than the reference temperature (Step S3). The following vehicle A1 is determined to exist obliquely behind the preceding vehicle A on the right side when the detection temperature is determined to be higher than the reference temperature. Also, the following vehicle A1 is determined not to exist obliquely behind the preceding vehicle A on the right side when the detection temperature is determined to be lower than the reference setting temperature.

Especially, when a signal is outputted from the comparing and determining section 5 to indicate that the following vehicle A1 is determined to exist obliquely behind the preceding vehicle A on the right side (Step S4), the signal is given to the base of the transistor 62 through the resistance 61 of the drive circuit 6. The transistor 62 of the drive circuit 6 is set to the ON state in response to the signal. In this way, it is auditorily notified to the driver P through the operation of the buzzer 71 that the other vehicle exists on the passing lane Rb, because the power supply Vcc is supplied to the buzzer 71 of the alarm unit 7.

Also, when the following vehicle A1 is determined by the comparing and determining section 5 not to exist obliquely behind the preceding vehicle A on the right side (Step S5), the drive circuit 6 is kept in an off state. Therefore, the alarm unit 7 is not driven and the buzzer 71 in the dashboard section DB does not generate any sound. Therefore, the driver can recognize that change of the lane is possible.

When the preceding vehicle A changes the lane from the passing lane Rb into the running lane Ra, whether or not the following vehicle A1 exists on the running lane Ra is detected by the left detecting unit 1L, and the similar operation is carried out.

According to the first embodiment, the existence or non-existence of the following vehicle can be detected based on the existence or non-existence of the radiation heat by the left detecting unit 1L or the right detecting unit 1R of the detecting unit 1, even when the existence of the following vehicle can not be confirmed because of the blind spot of the rearview mirror in case of change of the lane. Therefore, the propriety of the lane change can be accurately determined.

Especially, because the alarm unit 7 is the buzzer 71, it can be auditorily notified by buzzer 71 that the following vehicle exists and the lane change is improper.

Also, because the infrared sensor section 2 of the detecting unit section 1, i.e., the left detecting unit 1L or the right detecting unit 1R is arranged in such a manner that the tire Bar or Bal of the following vehicle whose temperature rises due to the high-speed rotation, is in the rear field of view, the signal-noise ratio to the background temperature can be taken high. Thus, it is possible to improve in the precision and reliability of the detection of the following vehicle.

Figure 7:
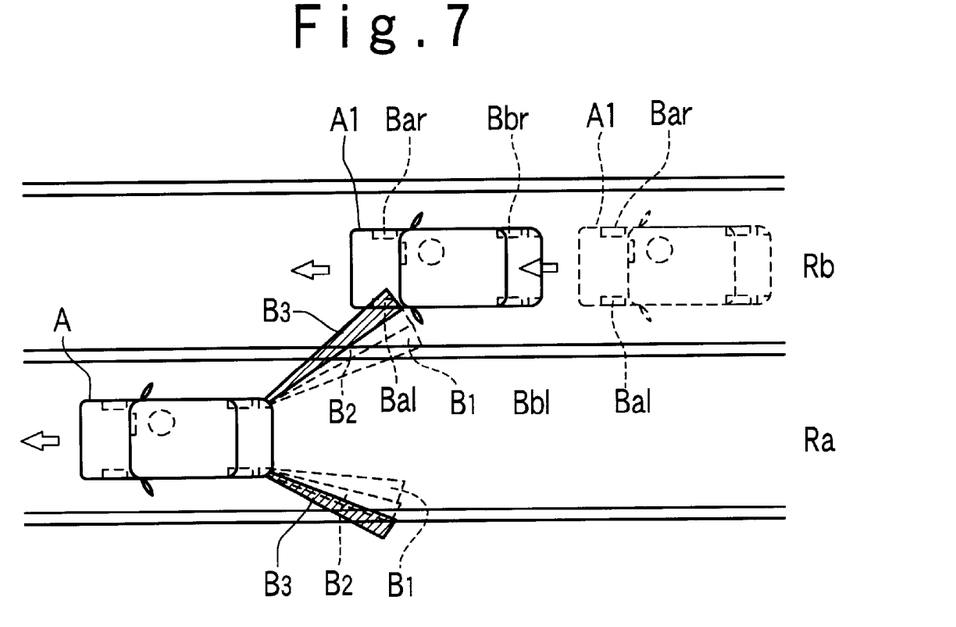
FIG. 7 is a diagram to explain the operation of the rear vehicle detecting apparatus according to a second embodiment of the present invention.
Figure 8:
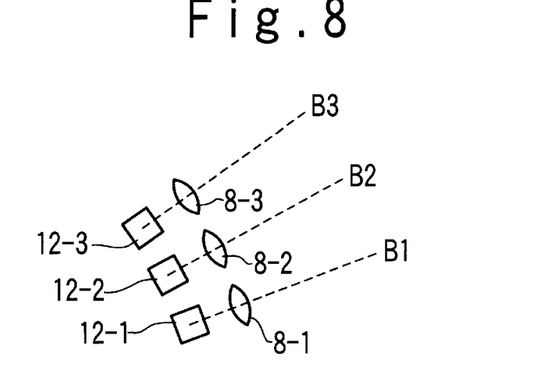
FIG. 8 is a diagram illustrating the detecting unit section of the rear vehicle detecting apparatus according to a third embodiment of the present invention.

FIG. 7 shows the rear vehicle detecting apparatus according to the second embodiment of the present invention. The rear vehicle detecting apparatus in the second embodiment is basically the same as the first embodiment. The different point is that a plurality of sets of lens and infrared sensor are provided in the infrared sensor section 2 for the left detecting unit 1L and the right detecting unit 1R which are arranged on the either rear side of the preceding vehicle A, as shown in FIG. 8. For example, when the infrared sensor section 2 is composed of three infrared sensors 12-1 to 12-3, the infrared sensor 12-1 to 12-3 are arranged to have different fields of view B1 to B3.

The rear vehicle detecting apparatus operates as follows. That is, it is supposed that the preceding vehicle A runs on the running lane Ra and the following vehicle A1 runs on the passing lane Rb. When the preceding vehicle A changes the lane from the running lane into the passing lane Rb, the confirmation of the existence or non-existence of the following vehicle is carried out. At this time, the existence or non-existence of the following vehicle A1 obliquely behind the vehicle A on the right side is detected by the infrared sensor section 2 of the right detecting unit 1R of the preceding vehicle A. When the existence of the following vehicle A1 is roughly confirmed by the first infrared sensor 12-1 as shown by the dotted line, it is informed that the following vehicle A1 has a considerable long interval from the vehicle A so that it is possible to change the lane. Also, when the existence of the following vehicle A1 is confirmed by the second and third infrared sensors 12-2 and 12-3 as shown by the solid line, it is informed that the following vehicle A1 is approaching the vehicle A so that it is impossible to change the lane.

According to the second embodiment, the distance from the vehicle A to the following vehicle A1 can be finely detected.

In the rear vehicle detecting apparatus in the third embodiment, a single infrared sensor 12 and a prism 25 in place of the lens 8 may be used to produce a plurality of fields of view B1 to B3. In this case, it is possible to compare the detected temperature of the heat source for each of the fields of view B1 to B3 with the reference temperature.

Figure 9:
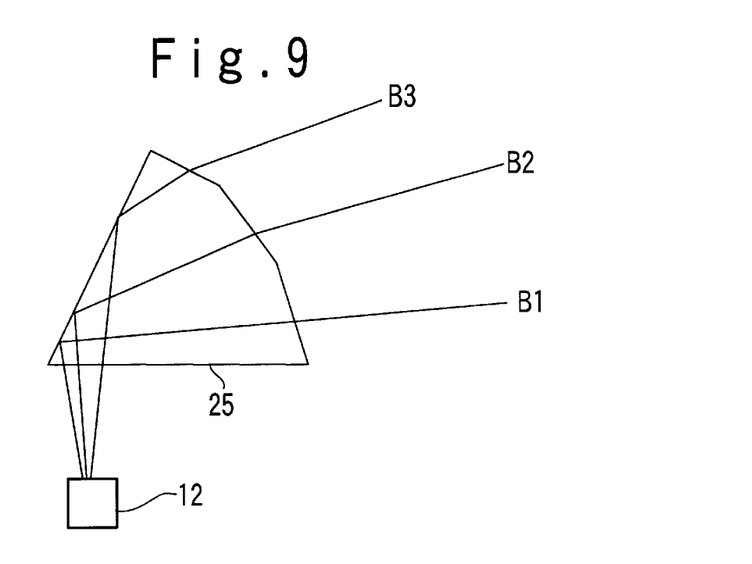
FIG. 9 is a diagram illustrating the detecting unit section of the rear vehicle detecting apparatus according to a fourth embodiment of the present invention.

Also, in the rear vehicle detecting apparatus in the fourth embodiment, each detecting unit 1R or 1L may be composed of a single infrared sensor 12 and the sensor driving section 11 (FIG. 2). In this case, the infrared sensor 12 is scanned in the fields of view B1 to B3 for every predetermined time, to collect heat from the heat source. Thus, it is possible to compare the detected temperature in each of the fields of view B1 to B3 with the reference temperature.

According to the fourth embodiment, when the scanning time is set suitably, it is possible to determine the approaching speed of the following vehicle A1 to the preceding vehicle A.

Figure 10:
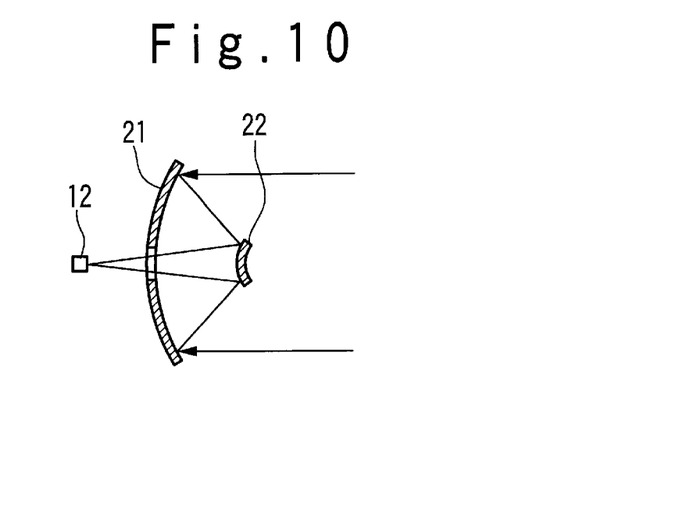
FIG. 10 is a cross sectional view of the infrared sensor of the rear vehicle detecting apparatus according to a fifth embodiment of the present invention.

FIG. 10 shows a rear detecting apparatus according to the fifth embodiment of the present invention. Referring to FIG. 10, the radiated heat from the heat source is collected on a sub-mirror 22 by a parabolic main mirror 21, and then is incident to the infrared sensor 2 through an opening formed in the center of the main mirror 21.

According to the fifth embodiment, the heat collection to the infrared sensor 12 can be efficiently performed and the detection precision of the following vehicle can be improved.

It should be noted that the present invention is not limited by the above embodiments. For example, the whole detecting unit section may be arranged in the vehicle rear portion, or only the infrared sensor of the detecting unit section may be arranged in the vehicle rear portion. In this case, the other components of the detecting unit section may be distributed in the car indoors.

Also, when a plurality of infrared sensors are used, the infrared sensors may be arranged in storage sections such as a stoplight, a car spoke light, a backlight in the rear, in addition to the trunk section, or may be arranged in any sections such as a bumper.

Also, the detection of the rear vehicle by the infrared sensor may be performed using the infrared rays which are radiated from the components other than the tire of the following vehicle A1.

Also, the heat collecting mechanism to the infrared sensor may be an off-axis method, a Newton method, or a Nasmith method.

Also, the steering system of the vehicle A may be controlled based on the detection result of the following vehicle A1. That is, the control section (8) calculated the data supplied from the comparing and determining section 5 and controls the steering mechanism restriction mechanism 9 (FIG. 2) based on the calculating result such that the vehicle A is not turned to the right direction.

Moreover, as the alarm unit 7, a visual technique such as a lamp and a liquid crystal panels may be applied in place of or in addition to the auditory technique such as the buzzer and the speaker. When the alarm unit 7 is changed from the buzzer or speaker into the lamp and/or the liquid crystal panel, the drive circuits 6R and 6L are changed in accordance with the change of the alarm unit.

As described above, according to the present invention, the existence of the heat source can be detected by the left detecting unit or the right detecting unit of the detecting unit, even when the existence of the following vehicle on an adjacent lane can not be confirmed by the blind spot of the rearview mirror change. Therefore, the existence of the following vehicle can be accurately determined.

Also, if the infrared sensor is arranged in such a manner that the tire of the following vehicle which has been risen in the temperature because of the high-speed rotation is in the rear eyesight of the infrared sensor in the left detecting unit or the right detecting unit of the detecting unit, it is possible to increase a signal-noise ratio to the background temperature. In this way, the existence or non-existence of the following vehicle can be precisely detected.

What is claimed is:

1. A rear vehicle detecting apparatus of a vehicle comprising:
    an alarm unit;
    a temperature detecting section detecting a first temperature data based on heat radiated from another vehicle which exists behind said vehicle;
    a reference temperature data generating section generating a second temperature data as a reference, said second temperature based on at least one environmental factor;
    a comparing section comparing said first temperature data and said second temperature data; and
    a drive section driving said alarm unit based on the comparing result by said comparing section.

2. A rear vehicle detecting apparatus according to claim 1, wherein said temperature detecting section includes:
    an optical system collecting the heat radiated from the other vehicle which exists behind the vehicle;
    an infrared sensor detecting the collected heat by said optical system; and
    a converting section converting the detected heat into said first temperature data.

3. A rear vehicle detecting apparatus according to claim 2, wherein said optical system includes a lens,
    wherein said temperature detecting section includes a plurality of sets of said lens and said infrared sensor, and
    wherein said plurality of sets are provided to have different fields of view.

4. A rear vehicle detecting apparatus according to claim 2, wherein said optical system includes:
    a first mirror collecting the heat radiated from the other vehicle which exists behind said vehicle;
    a second mirror which reflects the collected heat by said first mirror on said infrared sensor.

5. A rear vehicle detecting apparatus according to claim 2, wherein said optical system includes:
    a prism collecting the heat radiated from the other vehicle on said infrared sensor when the other vehicle exists in different positions relative to the vehicle.

6. A rear vehicle detecting apparatus according to claim 2, wherein said temperature detecting section further comprises:
    a drive section driving said optical system and said infrared sensor to orient different fields of view, depending upon time.

7. A rear vehicle detecting apparatus according to claim 1, wherein said rear vehicle detecting apparatus includes two sets of said temperature detecting sections respectively provided in a rear portion of said vehicle on left and right sides.

8. A rear vehicle detecting apparatus according to claim 1, wherein said reference temperature data generating section includes:
    a measuring unit measuring said at least one environmental factor about said vehicle; and
    a generating unit generating said second temperature data based on said measuring result of said measuring unit.

9. A rear vehicle detecting apparatus according to claim 1, wherein said temperature detecting section includes a plurality of infrared sensors detecting the radiated heat, and
    said comparing section time-divisionally comparing said first temperature data and said second temperature data for every infrared sensor.

10. A rear vehicle detecting apparatus according to claim 1, wherein said alarm unit is driven to output an alarm auditorily.

11. A rear vehicle detecting apparatus according to claim 1, wherein said alarm unit is provided in a front portion of said vehicle.

12. A rear vehicle detecting apparatus according to claim 1, wherein said temperature detecting section includes at least an infrared sensor, and
    said infrared sensor is of a bolometer type.

13. A rear vehicle detecting apparatus according to claim 1, wherein said temperature detecting section includes at least an infrared sensor, and
    said infrared sensor is of a pyroelectric type.

14. A rear vehicle detecting apparatus according to claim 1, wherein said temperature detecting section includes at least an infrared sensor, and
    said infrared sensor is of a thermopile type.

15. A vehicle having a rear vehicle detecting apparatus which comprises:
    a heat detecting section provided in a rear portion of said vehicle to detect heat radiated from another vehicle and to compare said detected heat to a reference temperature based on at least one environmental factor; and
    an alarm unit provided to output an alarm corresponding to the detecting result by said heat detecting section.

16. A vehicle according to claim 15, wherein said alarm unit is driven to output an alarm auditorily.

17. A vehicle according to claim 15, wherein said alarm unit is provided in a front portion of said vehicle.

18. A vehicle according to claim 15, wherein said temperature detecting section includes at least an infrared sensor, and said infrared sensor is of a bolometer type.

19. A vehicle according to claim 15, wherein said temperature detecting section includes at least an infrared sensor, and said infrared sensor is of a pyroelectric type.

20. A vehicle according to claim 15, wherein said temperature detecting section includes at least an infrared sensor, and said infrared sensor is of a thermopile type.

21. The rear vehicle detecting apparatus of claim 1 wherein said at least one environmental factor comprises ambient temperature.

22. A vehicle having a rear vehicle detecting apparatus of claim 15 wherein said at least one environmental factor comprises ambient temperature.

* * * * *